(12) United States Patent
Nakazawa et al.

(10) Patent No.: US 11,560,039 B2
(45) Date of Patent: Jan. 24, 2023

(54) VEHICULAR HEATER

(71) Applicant: DENSO CORPORATION, Kariya (JP)

(72) Inventors: Mitsuhiro Nakazawa, Kariya (JP);
Hitoshi Nakahata, Kariya (JP);
Tetsuya Takechi, Kariya (JP);
Yoshihiko Uesugi, Kariya (JP); Yuji
Kawazoe, Kariya (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 16/897,340

(22) Filed: Jun. 10, 2020

(65) Prior Publication Data
US 2020/0298665 A1 Sep. 24, 2020

Related U.S. Application Data

(63) Continuation of application No. PCT/JP2018/041080, filed on Nov. 6, 2018.

(30) Foreign Application Priority Data

Dec. 13, 2017 (JP) .............................. JP2017-238511

(51) Int. Cl.
B60H 1/08 (2006.01)
B60H 1/02 (2006.01)
B60H 3/02 (2006.01)

(52) U.S. Cl.
CPC ............... B60H 1/08 (2013.01); B60H 1/025 (2013.01); B60H 3/024 (2013.01)

(58) Field of Classification Search
CPC .......... B60H 1/025; B60H 1/08; B60H 3/024; B60H 1/024
(Continued)

(56) References Cited

U.S. PATENT DOCUMENTS

2009/0283604 A1 11/2009 Martinchick et al.
2013/0291577 A1 11/2013 Miyakoshi et al.
(Continued)

FOREIGN PATENT DOCUMENTS

DE 10239876 A1 3/2004
DE 102014113526 A1 3/2016
(Continued)

OTHER PUBLICATIONS

Seigo Watanabe, Refrigerant flow rate control system and air conditioner, Google Patents (Year: 2014).*
(Continued)

Primary Examiner — Avinash A Savani
Assistant Examiner — Dana K Tighe
(74) Attorney, Agent, or Firm — Harness, Dickey & Pierce, P.L.C.

(57) ABSTRACT

A vehicular heater includes a heat medium circuit connected to a heater core that heats vent air via heat exchange with a heat medium. The heat medium circuit includes a first flow path connected to the heater core through a power unit, and a second flow path arranged in parallel with the first flow path and connected to the heater core through a heat source different from the power unit. A controller adjusts a first flow rate of the heat medium in the first flow path to be larger than a second flow rate of the heat medium in the second flow path when the power unit is operating.

5 Claims, 6 Drawing Sheets

(58) Field of Classification Search
USPC .............................................................. 237/5
See application file for complete search history.

(56) References Cited

U.S. PATENT DOCUMENTS

| | | |
|---|---|---|
| 2016/0082805 A1 | 3/2016 | Graaf et al. |
| 2016/0257179 A1 | 9/2016 | Miyakoshi et al. |
| 2016/0297284 A1 | 10/2016 | Miyakoshi et al. |
| 2017/0106725 A1 | 4/2017 | Kim et al. |
| 2018/0208020 A1 | 7/2018 | Miyakoshi et al. |
| 2019/0077225 A1 | 3/2019 | Nakamura et al. |

FOREIGN PATENT DOCUMENTS

| | | | | |
|---|---|---|---|---|
| DE | 102016215526 A1 | | 4/2017 | |
| JP | 2001260640 A | * | 9/2001 | |
| JP | 2001260640 A | | 9/2001 | |
| JP | 2012176658 A | | 9/2012 | |
| JP | 2014036530 A | * | 2/2014 | ............. Y02T 10/70 |
| WO | WO-2017159455 A1 | | 9/2017 | |

OTHER PUBLICATIONS

Takeshi Ogasawara, Heating device for vehicle, Google Patents (Year: 2001).*

* cited by examiner

VEHICULAR HEATER

CROSS REFERENCE TO RELATED APPLICATIONS

The present application is a continuation application of International Patent Application No. PCT/JP2018/041080 filed on Nov. 6, 2018, which designated the U.S. and claims the benefit of priority from Japanese Patent Application No. 2017-238511 filed on Dec. 13, 2017.

TECHNICAL FIELD

The present disclosure relates to a vehicular heater which heats an air in a vehicle compartment.

BACKGROUND

Conventionally, a vehicular heater is configured to heat vent air supplied to a heating target space. One of such vehicular heater heats vent air by utilizing exhaust heat generated in a power unit mounted on a vehicle.

SUMMARY

According to at least one embodiment of the present disclosure, a vehicular heater is mounted on a vehicle having a power unit. The vehicular heater includes a blower that blows vent air into a vehicle compartment which is a space to be heated, a heat medium circuit connected to a heater core that heats the vent air blown by the blower via heat exchange with a heat medium, and a circulator that circulates the heat medium in the heat medium circuit. The heat medium circuit includes a first flow path connected to the heater core through the power unit, and a second flow path arranged in parallel with the first flow path and connected to the heater core through a heat source device different from the power unit. The vehicular heater further includes a flow rate control unit that adjusts a first flow rate of the heat medium flowing into the first flow path and a second flow rate of the heat medium flowing into the second flow path. The flow rate control unit adjusts the first flow rate to be larger than the second flow rate when the power unit is operating.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
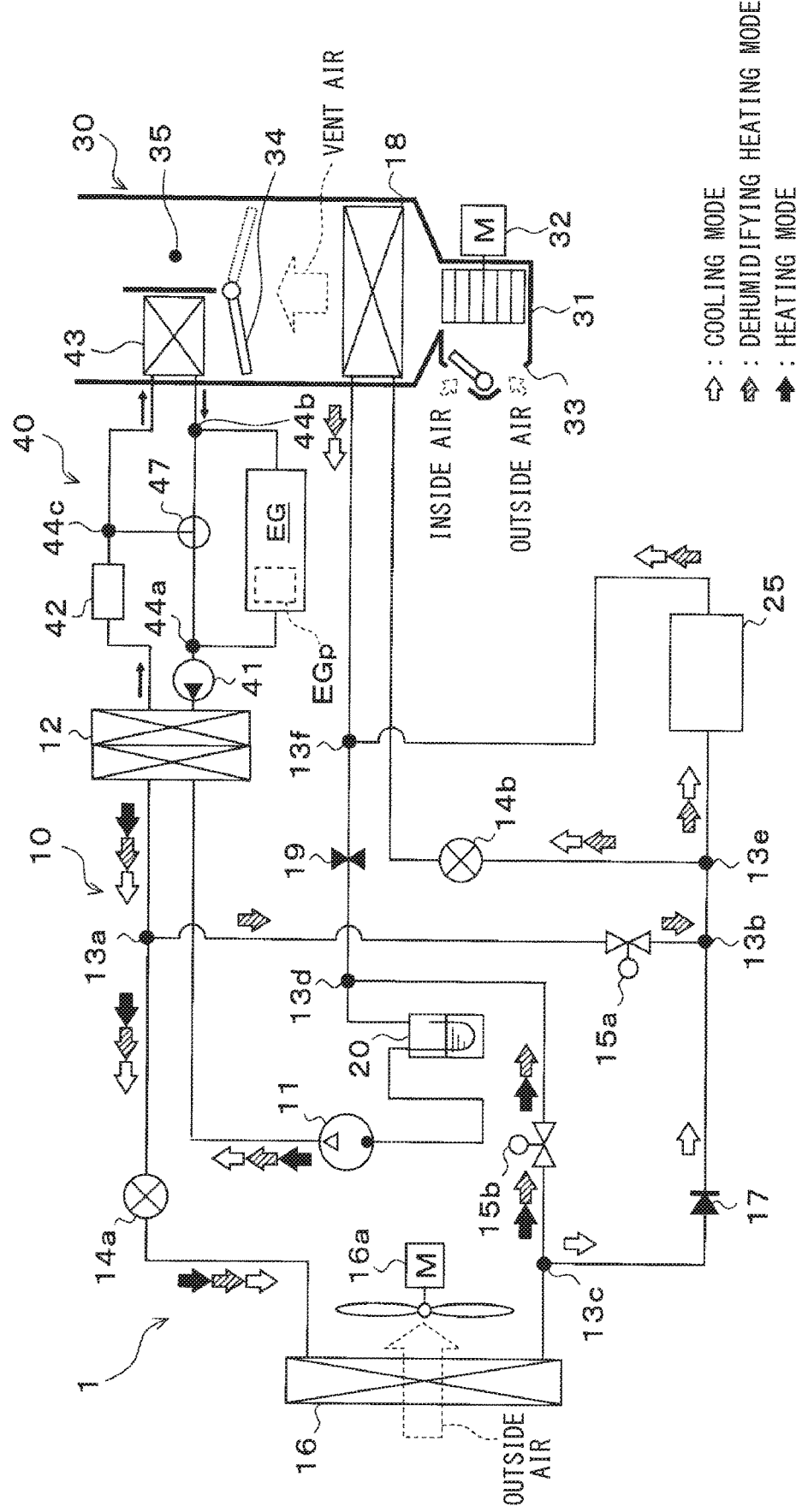
FIG. 1 is a diagram illustrating a schematic configuration of a vehicle air conditioner according to a first embodiment.

A comparative example will be described. A heating system of the comparative example includes a cooling water circuit that has a vehicle engine, a heater core, a heater, and a three-way valve. The heating system releases heat of cooling water to vent air in the heater core so as to achieve heating of a vehicle compartment.

Further, the cooling water circuit in the heating system is configured to operate the three-way valve in accordance with an operating state of the vehicle engine and a temperature of the cooling liquid so as to switch from multiple circuit configurations to one circuit configuration. For example, when the vehicle engine is operating, the circuit configuration is switched such that the cooling water circulates in the vehicle engine and the heater core. When the vehicle engine is not operating, the circuit configuration is switched such that the cooling water does not pass through the vehicle engine.

In recent years, hybrid vehicles have been developed, and vehicular heaters are also installed in such hybrid vehicles. The hybrid vehicle has a mode in which the vehicle engine is used as a drive source for running and a mode in which the vehicle engine is stopped and another drive source (for example, a motor) is used for running. Therefore, the heating system of the comparative example is applicable.

However, in the comparative example, the cooling water passes through the heater or the like in any of the multiple circuit configurations. The heater and the like are disposed as an alternative heat source when the vehicle engine is stopped.

That is, in the comparative example, the cooling water passes through the heater or the like in the circuit configuration when the vehicle engine is operating. Therefore, a flow resistance of water may become unnecessarily large. As a result, in the heating system of the comparative example, the heating performance may be deteriorated when the vehicle engine is operating.

In contrast, the present disclosure can provide a vehicular heater capable of reducing a decrease in heating performance due to an increase in water flow resistance while utilizing exhaust heat of the vehicle engine when the vehicle engine is operating.

According to one aspect of the present disclosure, a vehicular heater is mounted on a vehicle having a power unit. The vehicular heater includes a blower that blows vent air into a vehicle compartment which is a space to be heated, a heat medium circuit connected to a heater core that heats the vent air blown by the blower via heat exchange with a heat medium, and a circulator that circulates the heat medium in the heat medium circuit. The heat medium circuit includes a first flow path connected to the heater core through the power unit, and a second flow path arranged in parallel with the first flow path and connected to the heater core through a heat source device different from the power unit. The vehicular heater further includes a flow rate control unit that adjusts a first flow rate of the heat medium flowing into the first flow path and a second flow rate of the heat medium flowing into the second flow path. The flow rate control unit adjusts the first flow rate to be larger than the second flow rate when the power unit is operating.

The vehicular heater can recover the heat generated in the power unit by the heat medium flowing through the first flow path. The vehicular heater can heat the vent air in the heater core, and heat the vehicle compartment. The vehicular heater can recover the heat generated in the heat source device by the heat medium flowing through the second flow path. The vehicular heater can heat the vent air in the heater core, and heat the vehicle compartment.

According to the vehicular heater, the flow rate control unit adjusts the first flow rate to be larger than the second flow rate when the power unit is operating. Thus, the vehicular heater can recover exhaust heat generated by operation of the power unit and utilize it for heating the vehicle compartment.

In addition, in the vehicular heater, the first flow rate of the heat medium through the power unit is made larger than the second flow rate of the heat medium through the heat source device. Accordingly, the vehicular heater can reduce water flow resistance as compared with a case where the entire amount of the heat medium passes through the power unit and the heat source device. Thus, decrease in heating performance of the vehicular heater can be reduced.

Further, since the heat medium flows to the heat source device at the second flow rate, the vehicular heater can reduce temperature drop of the heat medium in the heat source device in a stopped state. Accordingly, the vehicular heater can prevents that an excessively cooled heat medium flows into the heater core at the time of reheating the vehicle compartment by using the heat source device again. Thus, a thermal shock load on the heater core can be reduced.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, a first embodiment of the present disclosure will be described with reference to FIGS. 1 to 4. A vehicle air conditioner 1 of the first embodiment is applied to a hybrid vehicle which obtains a driving force for vehicle running from both of an internal combustion engine (engine EG) and a vehicle-running electric motor.

The hybrid vehicle is configured as a so-called plug-in hybrid vehicle. Thus, the hybrid vehicle is configured such that a battery 25 mounted on the vehicle can be charged with power supplied from an external power source (e.g., commercial power source) when the vehicle is stopped. For example, the battery may be a lithium ion battery.

In the hybrid vehicle, the driving force outputted from the engine EG is used not only for vehicle running but also for operation of a power generator. The hybrid vehicle can store an electric power generated by the power generator and an electric power supplied from the external power source in the battery 25. The electric power stored in the battery 25 is supplied not only to the vehicle-running electric motor but also to various in-vehicle devices mounted on the hybrid vehicle.

The hybrid vehicle runs in the EV running mode when a state of charge SOC of the battery 25 is equal to or higher than a predetermined reference state of charge, such as when the vehicle starts running. The EV running mode means that the vehicle runs by the vehicle-running electric motor driven by the electric power of the battery 25.

On the other hand, the hybrid vehicle runs in the HV running mode when the state of charge of the battery 25 is lower than the predetermined reference state of charge during vehicle running. The HV running mode is a drive mode in which the vehicle is driven mainly by the driving force outputted from the engine EG. However, when a vehicle running load becomes high, the vehicle-running electric motor is operated to assist the engine EG.

The hybrid vehicle of the first embodiment switches between the EV running mode and the HV running mode as described above. Thus, the hybrid vehicle reduces an amount of fuel consumption and improves fuel efficiency as compared with a normal vehicle which obtains a driving force for vehicle running only from an engine EG.

Further, in the hybrid vehicle, the switching between the EV running mode and the HV running mode is controlled by a vehicle controller 70 described below. The engine EG in the hybrid vehicle corresponds to a power unit in the present disclosure.

The vehicle air conditioner 1 can be switched to multiple operation modes such as a heating mode, a cooling mode and a dehumidifying heating mode, in order to realize comfortable air conditioning in the vehicle compartment of the hybrid vehicle. Therefore, the vehicle air conditioner 1 corresponds to a vehicular heater of the present disclosure.

Further, the battery 25 which is a secondary battery is preferably used in an appropriate temperature range in order to make full use of charge and discharge capacity without promoting deterioration. Therefore, the vehicle air conditioner 1 has a function of cooling the battery 25 so as to maintain a temperature of the battery 25 within the appropriate temperature range.

As illustrated in FIG. 1, the vehicle air conditioner 1 includes a refrigeration cycle device 10, an indoor air conditioning unit 30, a heating medium circuit 40, and a controller 50. The refrigeration cycle device 10 is a device for adjusting a temperature of vent air by a vapor compression refrigeration cycle. The indoor air conditioning unit 30 sends vent air into the vehicle compartment of the hybrid vehicle. The heating medium circuit 40 is a heat medium circuit for heating the vent air via cooling water that is a heat medium.

The refrigeration cycle device 10 has a vapor compression refrigeration cycle, and has a function of heating or cooling the vent air in order to perform air conditioning in the vehicle compartment. Further, the refrigeration cycle device 10 has a function of cooling the battery 25 via a refrigerant at low pressure in the refrigeration cycle.

The refrigeration cycle device 10 is configured to be able to switch a refrigerant circuit to perform air conditioning in the vehicle compartment between a refrigerant circuit of the cooling mode, a refrigerant circuit of the dehumidifying heating mode, and a refrigerant circuit of the heating mode. In the vehicle air conditioner 1, the cooling mode is an operation mode in which the vehicle compartment is cooled by cooling vent air and blowing the vent air into the vehicle compartment.

The dehumidifying heating mode is an operation mode in which vehicle compartment is dehumidified and heated by reheating vent air which has been cooled and dehumidified and blowing the vent air into the vehicle compartment. The heating mode is an operation mode in which the vehicle compartment is heated by heating vent air and blowing the vent air into the vehicle compartment.

In FIG. 1, a flow of refrigerant in the refrigerant circuit of the cooling mode is indicated by white arrows. A flow of refrigerant in the refrigerant circuit of the dehumidifying heating mode is indicated by hatched arrows. A flow of refrigerant in the refrigerant circuit of the heating mode is indicated by black arrows.

The refrigeration cycle device 10 employs an HFC refrigerant (specifically, R134a) as a refrigerant and constitutes a vapor compression subcritical refrigeration cycle in which a pressure of refrigerant discharged from a compressor 11 does not exceed a critical pressure of the refrigerant. The refrigerant is mixed with refrigerant oil serving as a lubricant oil of a compressor 11, and the refrigerant oil partially circulates in the cycle together with the refrigerant.

The refrigeration cycle device 10 includes the compressor 11, a radiator 12, a first expansion valve 14a, a second expansion valve 14b, an outdoor heat exchanger 16, a check valve 17, and an indoor evaporator 18, an evaporation pressure control valve 19 and an accumulator 20.

The compressor 11 sucks a refrigerant in the refrigeration cycle device 10, and compresses and discharges the refrigerant. The compressor 11 includes an electric compressor that rotationally drives a fixed capacity compression mechanism having a fixed discharge capacity by an electric motor. The compressor 11 functions as a compressor in the present disclosure.

A refrigerant discharge capacity (i.e., rotation speed) of the compressor 11 is controlled by a control signal output from the controller 50 described later. The compressor 11 is disposed in a vehicle engine hood.

A discharge port of the compressor 11 is connected to a refrigerant inlet side of the radiator 12. The radiator 12 condenses high-pressure refrigerant by performing heat exchange between the high-pressure refrigerant discharged from the compressor 11 and cooling water which is heat medium circulating in the heating medium circuit 40 described later. The radiator 12 is constituted by a water-refrigerant heat exchanger and functions as a radiator in the present disclosure.

The heating medium circuit 40 that constitutes the vehicle air conditioner 1 will be described in detail later with reference to the drawings.

A refrigerant outlet side of the radiator 12 is connected with an inflow port side of a first three-way joint 13a. The first three-way joint 13a has three inflow-outflow ports communicating with each other. The three-way joint may be one in which multiple pipes are joined to each other, or may be one in which multiple refrigerant passages are provided in a metal block or a resin block.

The refrigeration cycle device 10 includes second to sixth three-way joints 13b to 13f, as described later. The basic configuration of each of the second to sixth three-way joints 13b to 13f is similar to that of the first three-way joint 13a.

One outflow port of the first three-way joint 13a is connected to an inlet side of the first expansion valve 14a. Another outflow port of the first three-way joint 13a is connected to one inflow port of the second three-way joint 13b.

A first on-off valve 15a is disposed in a refrigerant passage connecting the other outflow port of the first three-way joint 13a and the one inflow port of the second three-way joint 13b. The first on-off valve 15a is an electromagnetic valve that opens or closed the refrigerant passage connecting the other outflow port of the first three-way joint 13a and the one inflow port of the second three-way joint 13b.

As shown in FIG. 1, the refrigeration cycle device 10 includes a second on-off valve 15b, as described later. The basic configuration of the second on-off valve 15b is similar to that of the first on-off valve 15a. The first on-off valve 15a and the second on-off valve 15b can switch the refrigerant circuit of each of the above operation modes by opening or closing the refrigerant passage.

Therefore, the first on-off valve 15a and the second on-off valve 15b are a refrigerant circuit switching device which switches the refrigerant circuit of the cycle. An operation of each of the first on-off valve 15a and the second on-off valve 15b is controlled by a control voltage output from the controller 50.

The first expansion valve 14a is a decompressor that decompresses the refrigerant flowing out of the radiator 12 at least in the heating mode. The first expansion valve 14a is an electric variable throttle mechanism that includes a valve element that is changeable in degree of throttling, and an electric actuator that changes a degree of opening of the valve body. The first expansion valve 14a functions as a decompressor in the present disclosure.

Further, the refrigeration cycle device 10 includes a second expansion valve 14b, as described later. The basic configuration of the second expansion valve 14b is similar to that of the first expansion valve 14a. The first expansion valve 14a and the second expansion valve 14b have a full-opening function of fully opening a valve port and function as just a refrigerant path almost without performing flow rate adjustment and refrigerant decompression, and have a full-closing function of fully closing the valve port to obstruct a refrigerant path.

The first expansion valve 14a and the second expansion valve 14b can switch the refrigerant circuit according to the above-described respective operation modes by the fully-opening function and the fully-closing function. Therefore, the first expansion valve 14a and the second expansion valve 14b also have a function as the refrigerant circuit switching device. Operation of each of the first expansion valve 14a and the second expansion valve 14b is controlled by a control signal (control pulse) output from the controller 50.

An outlet of the first expansion valve 14a is connected to a refrigerant inlet side of the outdoor heat exchanger 16. The outdoor heat exchanger 16 is a heat exchanger that performs heat exchange between the refrigerant flowing out of the first expansion valve 14a and an outside air supplied by an outside-air fan 16a. The outdoor heat exchanger 16 is disposed on a front part in the vehicle engine hood.

The outdoor heat exchanger 16 functions as a radiator that releases heat of high-pressure refrigerant at least in the cooling mode, and functions as an evaporator that evaporates low-pressure refrigerant at least in the heating mode. That is, the outdoor heat exchanger 16 corresponds to an evaporator in the present disclosure.

The outside-air fan 16a includes an electric blower. A blowing capacity (i.e., rotation speed) of the outside-air fan 16a is controlled by a control voltage output from the controller 50.

A refrigerant outlet of the outdoor heat exchanger 16 is connected to an inflow port side of the third three-way joint 13c. One outflow port of the third three-way joint 13c is connected to one inflow port of the fourth three-way joint 13d.

A second on-off valve 15a is disposed in a refrigerant passage connecting the one outflow port of the third three-way joint 13c and the one inflow port of the fourth three-way joint 13d. Opening and closing of the second on-off valve 15b can switch between allowing and blocking of a refrigerant flow in the refrigerant passage.

Another outflow port of the third three-way joint 13c is connected to another inflow port of the second three-way joint 13b. A check valve 17 is disposed in a refrigerant passage connecting the other outflow port of the third three-way joint 13c and the other inflow port of the second three-way joint 13b.

The check valve 17 allows the refrigerant to flow from the third three-way joint 13c (i.e., the outdoor heat exchanger 16) toward the second three-way joint 13b (i.e., the second expansion valve 14b and the radiator 12). The check valve 17 fulfills a function of prohibiting the refrigerant from flowing from the second three-way joint 13b toward the third three-way joint 13c.

An outflow port of the second three-way joint 13b is connected to an inflow port side of the fifth three-way joint 13e. One outflow port of the fifth three-way joint 13e is connected to an inlet side of the second expansion valve 14b. Another outflow port of the fifth three-way joint 13e is connected to a refrigerant inlet side of a water jacket of the battery 25.

The water jacket of the battery 25 is arranged so as to cover an outer surface of the battery 25, and has a refrigerant channel inside the water jacket. Therefore, the low-pressure refrigerant flowing out from the other outflow port of the fifth three-way joint 13e absorbs heat generated in the battery 25 and cools the battery 25. A refrigerant outlet side of the water jacket of the battery 25 is connected to one inflow port side of the sixth three-way joint 13f.

The second expansion valve 14b is an electric variable throttle mechanism that decompresses the refrigerant flowing out of the outdoor heat exchanger 16 at least in the cooling mode. An outlet side of the second expansion valve 14b is connected to a refrigerant inlet side of the indoor evaporator 18.

The indoor evaporator 18 is disposed in an air conditioning case 31 of the indoor air conditioning unit 30 described later. The indoor evaporator 18 is a cooling heat exchanger that performs heat exchange at least in the cooling mode between a low-pressure refrigerant decompressed by the second expansion valve 14b and vent air supplied from a blower 32 to evaporate the low-pressure refrigerant such that the refrigerant exhibits a heat absorbing action to cool the vent air. A refrigerant outlet of the indoor evaporator 18 is connected to another inflow port side of the sixth three-way joint 13f.

An outflow port of the sixth three-way joint 13f is connected to an inlet side of the evaporation pressure control valve 19. The evaporation pressure control valve 19 includes a mechanical variable throttle mechanism that increases a degree of valve opening with increase in refrigerant pressure on an outlet side of the indoor evaporator 18.

The evaporation pressure control valve 19 fulfils a function to keep a refrigerant evaporating pressure Pe in the indoor evaporator 18 above or at a predetermined reference pressure in order to prevent frost formation on the indoor evaporator 18. The evaporation pressure control valve 19 can keep the refrigerant evaporating pressure Pe in the indoor evaporator 18 above or at the predetermined reference pressure such that frost formation on the indoor evaporator 18 can be reduced.

An outlet side of the evaporation pressure control valve 19 is connected to another inflow port side of the fourth three-way joint 13d. An outlet of the fourth three-way joint 13d is connected to an inlet side of the accumulator 20. The accumulator 20 is a gas-liquid separator that separates gas and liquid of the refrigerant flowing into the accumulator 20 and stores therein surplus liquid-phase refrigerant of the cycle. A gas-phase refrigerant outlet of the accumulator 20 is connected to a suction port side of the compressor 11.

Next, the indoor air conditioning unit 30 of the vehicle air conditioner 1 will be described. The indoor air conditioning unit 30 supplies vent air which has been conditioned in temperature by the refrigeration cycle device 10 to the vehicle compartment. The indoor air-conditioning unit 30 is disposed inside an instrument panel at the foremost part of the inside of the vehicle compartment.

As shown in FIG. 1, the indoor air conditioning unit 30 includes a blower 32, the indoor evaporator 18, and a heater core 43, which are housed in the air conditioning case 31 that constitutes an outer shell of the indoor air conditioning unit 30. That is, in the indoor air conditioning unit 30, the indoor evaporator 18 and the heater core 43 are arranged in an air passage provided inside the air conditioning case 31.

The air conditioning case 31 has the air passage for vent air supplied into the vehicle compartment. The air conditioning case 31 is formed of a resin (for example, polypropylene) having a certain degree of elasticity and also excellent in strength.

An inside-outside air switch device 33 is disposed on a most upstream side of the air conditioning case 31 in flow of the vent air. The inside-outside air switch device 33 switches and introduces an inside air (air inside the vehicle compartment) and an outside air (air outside the vehicle compartment) into the air conditioning case 31.

The inside-outside air switch device 33 continuously adjusts an opening area of an inside air introduction port through which the inside air is introduced into the air conditioning case 31 and an opening area of an outside air introduction port through which the outside air is introduced into the air conditioning case 31 by using an inside-outside air switch door to change an introduction ratio of an introduction air volume of the inside air to an introduction air volume of the outside air. The inside-outside air switch door is driven by an electric actuator for the inside-outside air switch door. Operation of the electric actuator is controlled by a control signal output from the controller 50.

The blower 32 is disposed downstream of the inside-outside air switch device 33 in flow of the vent air. The blower 32 includes an electric blower that drives a centrifugal multi-blade fan with an electric motor. The blower 32 blows air sucked through the inside-outside air switch device 33 toward the inside of the vehicle compartment. A blowing capacity (i.e., rotation speed) of the blower 32 is controlled by a control voltage output from the controller 50.

The indoor evaporator 18 and the heater core 43 are disposed in this order downstream of the blower 32 in flow of the vent air. In other words, the indoor evaporator 18 is disposed upstream of the heater core 43 in flow of the vent air.

The heater core 43 is one of components of the heating medium circuit 40, and is a heating heat exchanger that heats the vent air via heat exchange between the cooling water circulating in the heating medium circuit 40 and the vent air that has passed through the indoor evaporator 18. The details of the heating medium circuit 40 including the heater core 43 will be described in detail later with reference to the drawings.

A bypass passage 35 is provided inside the air conditioning case 31. The bypass passage 35 guides the vent air that has passed through the indoor evaporator 18 to bypass the heater core 43.

An air mixing door 34 is disposed in the air conditioning case 31 downstream of the indoor evaporator 18 in flow of the vent air and upstream of the heater core 43 in flow of the vent air.

The air mixing door 34 is an air volume ratio control unit which controls an air volume ratio of a volume of the vent air passing through the heater core 43 to a volume of the vent air passing through the bypass passage 35 after passing through the indoor evaporator 18.

The air mixing door 34 is driven by an electric actuator for the air mixing door. Operation of the electric actuator is controlled by a control signal output from the controller 50.

A mixing space is formed downstream of the heater core 43 and the bypass passage 35 in flow of the vent air. The mixing space is a space in which the vent air heated by heat exchange with the cooling water in the heater core 43 and the unheated vent air passing through the bypass passage 55 are mixed.

A downstream portion of the air conditioning case 31 in flow of the vent air has multiple opening holes through which the vent air (i.e., conditioned air) mixed in the mixing space is supplied to the inside of the vehicle compartment which is an air conditioning target space.

The opening holes include a face opening hole, a foot opening hole, and a defroster opening hole (any of them is not shown). The face opening hole is an opening hole for blowing the air conditioning wind toward an upper body of an occupant in the vehicle compartment. The foot opening hole is an opening hole for blowing the air conditioning wind toward a foot of the occupant. The defroster opening hole is an opening hole for blowing the air conditioning wind toward an inner surface of a vehicle front window glass.

The face opening hole, the foot opening hole, and the defroster opening hole are respectively connected through ducts defining air passages to a face vent, a foot vent, and a defroster vent (any of them is not shown) provided in the vehicle compartment.

Therefore, the air mixing door 34 adjusts an air volume ratio between an air volume passing through the heater core 43 and an air volume passing through the bypass passage 35, thereby adjusting the temperature of the air conditioning wind mixed in the mixing space. According to this, the temperature of the vent air (conditioned air) blown into the vehicle compartment through the vents is adjusted.

A face door, a foot door and a defroster door are disposed, respectively, upstream of the face opening hole, the foot opening hole and the defroster opening hole in flow of the vent air. The face door adjusts an opening area of the face opening hole. The foot door adjusts an opening area of the foot opening hole. The defroster door adjusts an opening area of the defroster opening hole.

The face door, the foot door, and the defroster door form a vent mode switching door for switching vent modes. These doors are connected to an electric actuator for driving a vent mode door through a link mechanism or the like, and are rotationally operated in conjunction with the actuator. Operation of the electric actuator is controlled by a control signal output from the controller 50.

The vent mode switched by the vent mode switching device includes a face mode, a bi-level mode, and a foot mode, for example.

The face mode is a vent mode in which the face vent is fully opened to blow out air therefrom toward the upper body of an occupant in the vehicle compartment. The bi-level mode is a vent mode in which both the face vent and the foot vent are opened to blow out air therefrom toward the upper body and a foot area of the occupant in the vehicle compartment. The foot mode is a vent mode in which the foot vent is fully opened and the defroster vent is opened slightly so that the air is blown mainly from the foot vent.

Further, the occupant can manually set the defroster mode by manually operating a vent mode switch provided on an operation panel 60. The defroster mode is a vent mode in which the defroster vent is fully opened so that air is blown toward an inner face of the vehicle front window glass through the defroster vent.

Next, the heating medium circuit 40 of the vehicle air conditioner 1 will be described. The heating medium circuit 40 is a heat medium circuit that circulates a heat medium between the radiator 12 of the refrigeration cycle device 10, component apparatuses of the hybrid vehicle, and the heater core 43. Cooling water is used as the heat medium in the heating medium circuit 40. For example, water, an ethylene glycol aqueous solution, or the like can be adopted as this cooling water.

Figure 3:
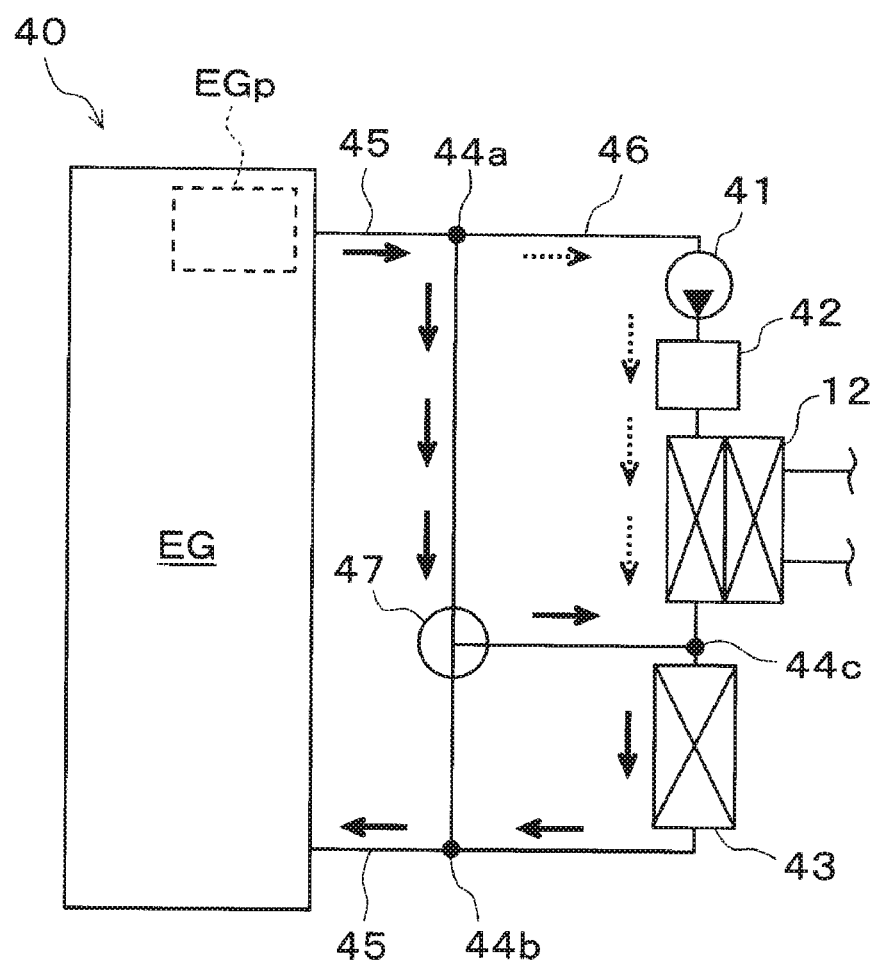
FIG. 3 is an explanatory diagram illustrating a state of a heating medium circuit in an HV running mode according to the first embodiment.

As shown in FIGS. 1 and 3, the heating medium circuit 40 includes the radiator 12 of the refrigeration cycle device 10, the engine EG, a heating water pump 41, a water heater 42, and the heater core 43. These components of the heating medium circuit 40 are connected via a cooling water path, thereby forming a closed circuit in which the heat medium can circulate.

The engine EG is an internal combustion engine in the hybrid vehicle and corresponds to a power unit in the present disclosure. The engine EG is arranged in the cooling water path of the heating medium circuit 40 such that the engine EG is capable of exchanging heat with the cooling water.

An engine pump EGp is arranged in the engine EG on an outflow port side of the cooling water path. The engine pump EGp is an electric pump that sucks in and discharges the cooling water of the heating medium circuit 40, and forms a part of a circulator in the present disclosure.

An operation of the engine pump EGp is controlled by the controller 50. The engine pump EGp may be a belt drive pump that is driven by transmission of a driving force of the engine EG via a belt.

A discharge port side of the engine pump EGp is connected to an inflow-outflow port of a first connecting portion 44a. The first connecting portion 44a connects three cooling water paths and has three inflow-outflow ports. The first connecting portion 44a functions as a branching portion or a joining portion of flows of the cooling water in the heating medium circuit 40.

As shown in FIG. 1 and other drawings, the heating medium circuit 40 has a second connecting portion 44b and a third connecting portion 44c. The basic configurations of the second connecting portion 44b and the third connecting portion 44c are similar to that of the first connecting portion 44a so as to function as a branch portion and a joining portion of the heating medium circuit 40.

Another inflow-outflow port of the first connecting portion 44a is connected to a suction port side of the heating water pump 41. Further, the remaining one inflow-outflow port of the first connecting portion 44a is connected to one of inflow-outflow ports of a flow control valve 47.

The heating water pump 41 is a water pump that sucks the cooling water from the first connecting portion 44a and pumps it. The heating water pump 41 constitutes a part of the circulator in the present disclosure. A discharge port side of the heating water pump 41 is connected to an inflow port side of the water heater 42.

Therefore, the heating water pump 41 can pump the cooling water flowing out of the first connecting portion 44*a* toward the water heater 42. A pumping capacity (i.e., rotation speed) of the heating water pump 41 is controlled by a control voltage output from the controller 50.

The water heater 42 is a heating device that heats the cooling water flowing out of the heating water pump 41. The water heater 42 has, for example, a PTC element or a nichrome wire. The water heater 42 generates heat to heat the cooling water by supply of control power output from the controller 50.

Thus, a heating capacity of the water heater 42 to heat the cooling water is controlled by the control power output from the controller 50. The water heater 42 functions as a heat source device in the present disclosure and corresponds to a heater in the present disclosure.

A cooling-water outflow port side of the water heater 42 is connected to a cooling-water inflow port side of the radiator 12. As described above, the radiator 12 constitutes the refrigeration cycle device 10. At least in the heating mode, high-pressure refrigerant compressed by the compressor 11 releases heat to the cooling water circulating in the heating medium circuit 40 in the radiator 12.

Accordingly, in the radiator 12, the cooling water of the heating medium circuit 40 is heated by using the heat of the high-pressure refrigerant as a heat source. That is, the radiator 12 of the refrigeration cycle device 10 operating at least in the heating mode functions as the heat source device in the present disclosure.

A cooling-water outflow port side of the radiator 12 is connected to one inflow-outflow port side of the third connecting portion 44*c*. Another inflow-outflow port side of the third connecting portion 44*c* is connected to an inflow port side of the heater core 43. The remaining one inflow-outflow port of the third connecting portion 44*c* is connected to one of the inflow-outflow ports of the flow control valve 47.

As described above, the heater core 43 is the heating heat exchanger that heats the vent air via heat exchange between the cooling water circulating in the heating medium circuit 40 and the vent air that has passed through the indoor evaporator 18. As shown in FIG. 1, the heater core 43 is disposed in the air conditioning case 31 of indoor air conditioning unit 30 and corresponds to a heater core in the present disclosure.

The flow control valve 47 includes a so-called electromagnetic three-way valve. As described above, one inflow-outflow port of the flow control valve 47 is connected to the first connecting portion 44*a*, and another inflow-outflow port is connected to the third connecting portion 44*c*.

The remaining one inflow-outflow port of the flow control valve 47 is connected to the second connecting portion 44*b*. Therefore, the flow control valve 47 is capable of adjusting a flow rate of the cooling water passing through each inflow-outflow port by actuating a valve element arranged inside the flow control valve 47. An operation of the first flow control valve 47 is controlled by a control signal output from the controller 50.

The flow control valve 47 is capable of adjusting flow rates of the cooling water in the first connecting portion 44*a*, the second connecting portion 44*b* and the third connecting portion 44*c* in accordance with the control signal of the controller 50. In other words, the flow control valve 47 is capable of switching a flow channel configuration of the heating medium circuit 40 in which the cooling water flows.

An outflow port side of the heater core 43 is connected to one inflow-outflow port side of the second connecting portion 44*b*. The remaining one inflow-outflow port of the flow control valve 47 is connected to another inflow-outflow port of the second connecting portion 44*b*.

The remaining one inflow-outflow port side of the second connecting portion 44*b* is connected to a cooling-water inflow port side of the engine EG. Therefore, the heating medium circuit 40 can form a circulation circuit of the cooling water passing through the engine EG and the heater core 43, for example.

The heating medium circuit 40 according to the first embodiment has a first connection flow path 45. The first connection flow path 45 includes a cooling water path that connects an outflow port side of the engine EG and the first connecting portion 44*a*, and a cooling water path that connects an inflow port side of the engine EG and the second connecting portion 44*b*. The first connection flow path 45 corresponds to a first flow path in the present disclosure.

The heating medium circuit 40 has a second connection flow path 46. The second connection flow path 46 is one of the cooling water paths that connect the first connecting portion 44*a* and the third connecting portion 44*c*. The water heater 42 is arranged in the second connection flow path 46. The second connection flow path 46 corresponds to a second flow path in the present disclosure.

Figure 2:
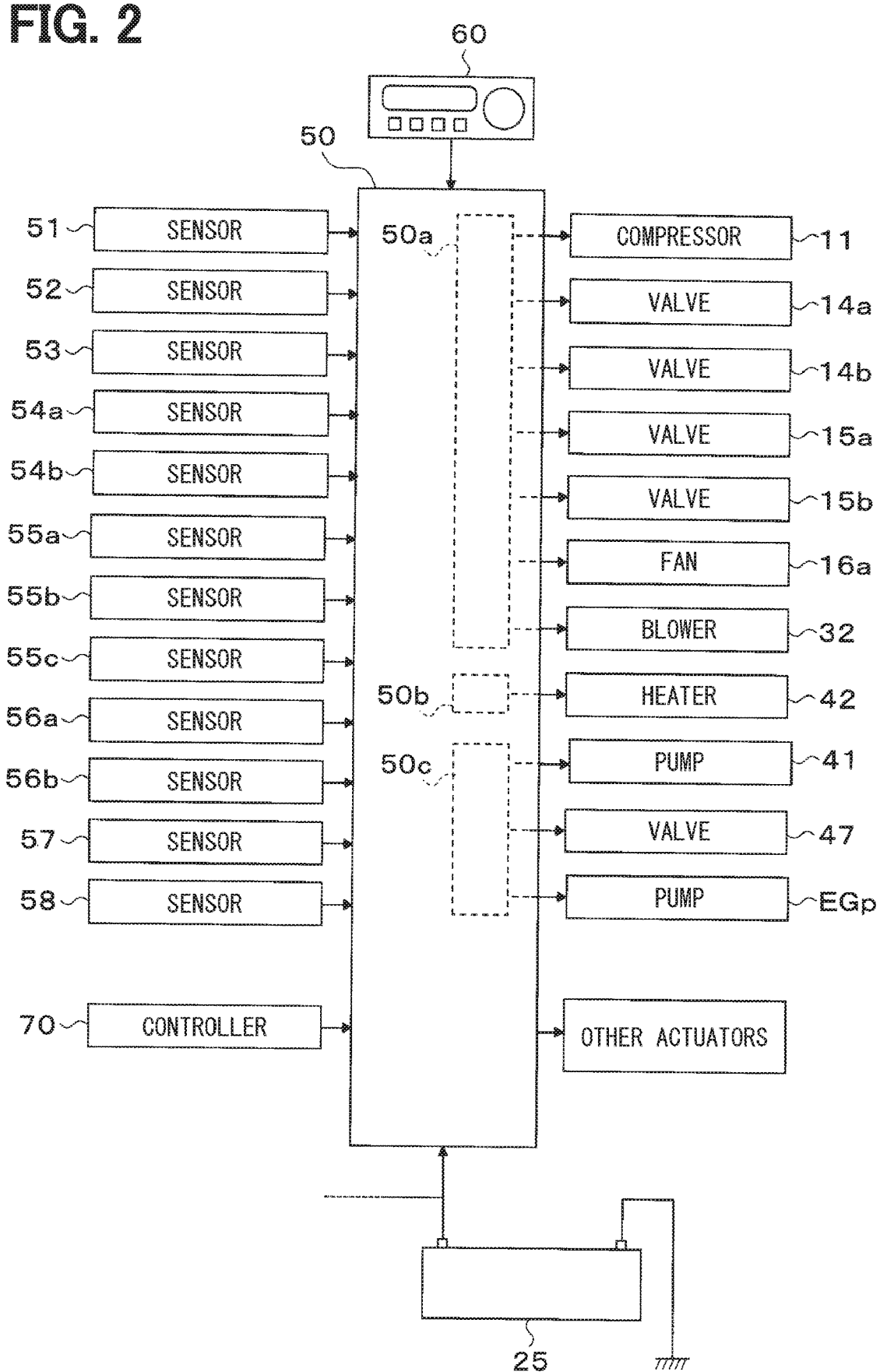
FIG. 2 is a block diagram illustrating a control system for the vehicle air conditioner according to the first embodiment.

Next, a control system of the vehicle air conditioner 1 according to the first embodiment will be described. As shown in FIG. 2, the vehicle air conditioner 1 has the controller 50. The controller 50 includes a known microcomputer including CPU, ROM and RAM, and its peripheral circuits.

The controller 50 performs calculations and processing based on control air-conditioning control programs stored in the ROM to control various controlled devices connected with an output side of the controller 50. The controlled devices include the compressor 11, the first expansion valve 14*a*, the second expansion valve 14*b*, the first on-off valve 15*a*, the second on-off valve 15*b*, the outside-air fan 16*a*, the blower 32, the heating water pump 41, the water heater 42, the flow control valve 47 and the engine pump EGp.

Further, an input side of the controller 50 is connected with various air-conditioning sensors used for control of the operation of the vehicle air conditioner 1. Detection signals of these air-conditioning sensors are input to the controller 50.

As shown in FIG. 3, the air-conditioning sensors include an inside air temperature sensor 51, an outside air temperature sensor 52, an solar sensor 53, a first water temperature sensor 54*a*, a second water temperature sensor 54*b*, a first refrigerant temperature sensor 55*a*, and a second refrigerant temperature sensor 55*b*, a third refrigerant temperature sensor 55*c*, a discharge pressure sensor 56*a*, an outdoor unit pressure sensor 56*b*, an evaporator temperature sensor 57, and a conditioned air temperature sensor 58.

The inside air temperature sensor 51 is an inside air temperature detector that detects a vehicle-compartment interior temperature (an inside air temperature) Tr. The outside air temperature sensor 52 is an outside air temperature detector that detects a vehicle-compartment exterior temperature (an outside air temperature) Tam. The solar sensor 53 is a solar irradiance detector that detects a solar irradiance As in the vehicle compartment.

The first water temperature sensor 54*a* is a cooling water temperature detector that detects a cooling water temperature on the cooling-water inflow port side of the radiator 12 in the heating medium circuit 40. The second water temperature sensor 54b is a cooling water temperature detector that detects a cooling water temperature on the cooling-water outflow port side of the radiator 12 in the heating medium circuit 40.

The first water temperature sensor 54a detects the cooling water temperature on the inflow port side of the radiator 12. However, a sensor that detects a temperature of the cooling water flowing out of the heater core 43 may be adopted as the first water temperature sensor 54a.

The first refrigerant temperature sensor 55a is a first refrigerant temperature detector that detects a discharge temperature Td1 of the refrigerant discharged from the compressor 11. The second refrigerant temperature sensor 55b is a second refrigerant temperature detector that detects an outlet discharge temperature Td2 of the refrigerant discharged from the radiator 12. The third refrigerant temperature sensor 55c is a third refrigerant temperature detector that detects a temperature (outdoor heat exchanger temperature) Td3 of the refrigerant flowing out of the outdoor heat exchanger 16.

The discharge pressure sensor 56a is a discharge pressure detector that detects a high-pressure refrigerant pressure Pd in a refrigerant passage leading from a discharge port side of the compressor 11 to the inlet side of the first expansion valve 14a. The outdoor unit pressure sensor 56b is an outdoor unit pressure detector that detects a pressure (outdoor unit refrigerant pressure) Ps of the refrigerant flowing out of the outdoor heat exchanger 16.

The evaporator temperature sensor 57 is an evaporator temperature detector that detects a refrigerant evaporation temperature (evaporator temperature) Tefin in the indoor evaporator 18. The conditioned air temperature sensor 58 is a conditioned-air temperature detector that detects a vent air temperature TAV sent from the mixing space into the vehicle compartment.

As shown in FIG. 3, the input side of the controller 50 is connected to the operation panel 60. The operation panel 60 disposed in vicinity of an instrument panel in a front region in the vehicle compartment has various operation switches. Thus, the controller 50 receives operation signals from the various operation switches.

The various operation switches of the operation panel 60 include an auto switch, a cooling switch, an air volume setting switch, a temperature setting switch, a vent mode selector switch. The auto switch is operated when starting or terminating an automatic control operation of the vehicle air conditioner 1.

The cooling switch is operated when requesting the vehicle air conditioner 1 to cool the vehicle compartment. The air volume setting switch is operated when manually setting an air volume of the blower 32. The temperature setting switch is operated when setting a target temperature Tset of the vehicle compartment. The vent mode selector switch is operated when manually setting the vent mode in the vehicle air conditioner 1.

The input side of the controller 50 is connected to the vehicle controller 70. As described above, in the hybrid vehicle, the vehicle controller 70 controls the switching between the EV running mode and the HV running mode. Thus, the controller 50 receives an input of a running mode signal indicating a running mode of the hybrid vehicle (i.e., the HV running mode or the EV running mode).

The controller 50 according to the first embodiment integrally includes control units that control the various controlled devices connected to the output side of the controller 50. Configurations (e.g., hardware and software) controlling operations of the respective controlled devices constitute the control units that control the operations of the respective controlled device.

For example, a configuration of the controller 50 that controls an amount of heat generated in the refrigeration cycle device 10 constitutes a cycle heat amount control unit 50a. The cycle heat amount control unit 50a can be said to be a configuration that controls operations of the compressor 11, the first expansion valve 14a, the second expansion valve 14b, the first on-off valve 15a, the second on-off valve 15b, the outside-air fan 16a and the blower 32.

A configuration of the controller 50 that controls an amount of heat generated by the water heater 42 constitutes a heater heat amount control unit 50b. The heater heat amount control unit 50b can be said to be a configuration that controls an amount of electric power supplied to the water heater 42.

Further, a configuration of the controller 50 that controls operations of the water heater 42, the engine pump EGp and the flow control valve 47 constitutes a cooling-water flow rate control unit 50c. The cooling-water flow rate control unit 50c can be said to be a configuration that adjusts a flow rate balance between a flow rate of the cooling water passing through the engine EG and a flow rate of the cooling water passing through the heat source device (i.e., the water heater 42 and the radiator 12).

Next, each of operation modes of the vehicle air conditioner 1 according to the first embodiment will be described. As described above, the vehicle air conditioner 1 is capable of performing cooling, dehumidifying heating, and heating of the vehicle compartment. The refrigeration cycle device 10 in the vehicle air conditioner 1 switches between the cooling mode, the dehumidifying heating mode, and the heating mode, for air conditioning of the vehicle compartment.

Switching between these operation modes of the refrigeration cycle device 10 is performed by execution of the air-conditioning control program. The air-conditioning control program is executed when the auto switch of the operation panel 60 is turned on.

More specifically, in a main routine of the air-conditioning control program, detection signals of the above-described air-conditioning sensors and operation signals from the various air-conditioning operation switches are read. Then, based on the value of the detection signal and the value of the operation signal, a target blowing temperature TAO which is a target temperature of the air blown into the vehicle compartment is calculated based on the following formula F1.

$$TAO = Kset \times Tset - Kr \times Tr - Kam \times Tam - Ks \times As + C \tag{F1}$$

Tset is the target temperature in the vehicle compartment set with the temperature setting switch, Tr is the inside air temperature detected by the inside air temperature sensor 51, Tam is the outside air temperature detected by the outside air temperature sensor 52, and As is the amount of solar irradiance detected by the solar sensor 53. Kset, Kr, Kam, and Ks are control gains, and C is a constant for correction.

When the cooling switch of the operation panel 60 is turned on and the target blowing temperature TAO is lower than a predetermined cooling reference temperature α, the operation mode is switched to the cooling mode.

When the cooling switch of the operation panel 60 is turned on and the target blowing temperature TAO is higher than or equal to the predetermined cooling reference temperature α, the operation mode is switched to the dehumidifying heating mode. When the cooling switch of the operation panel 60 is not turned on, the operation mode is switched to the heating mode.

Thus, the cooling mode is performed usually when the outside air temperature is relatively high like summer season. The dehumidifying heating mode is performed usually in spring or autumn season. The heating mode is performed usually when the outside air temperature is low in winter season.

(a) Cooling Mode

First, an operation of the refrigeration cycle device 10 in the cooling mode will be described. In the cooling mode, the controller 50 controls the first expansion valve 14a to be in a fully open state and controls the second expansion valve 14b to be in a throttled state to exert a pressure reducing action.

Further, the controller 50 closes the first on-off valve 15a and closes the second on-off valve 15b. The controller 50 controls the air mixing door 34 such that an air passage of the heater core 43 is fully closed and the bypass passage 35 is fully open.

Thus, in the cooling mode of the refrigeration cycle device 10, as indicated by the white arrows in FIG. 1, a vapor compression refrigeration cycle is formed in which the refrigerant circulates in sequence: compressor 11 (→radiator 12→first expansion valve 14a)→outdoor heat exchanger 16→check valve 17→second expansion valve 14b→indoor evaporator 18→evaporation pressure control valve 19→accumulator 20→compressor 11.

In this cycle configuration, the controller 50 determines a refrigerant discharge capacity of the compressor 11 (i.e., a control signal output to the electric motor of the compressor 11). More specifically, an operation of the compressor 11 is controlled such that the vent air flowing out of the indoor evaporator 18 has a target evaporator temperature TEO.

The target evaporator temperature TEO is determined based on the target blowing temperature TAO with reference to a control map stored in advance in the controller 50. In this control map, the target evaporator temperature TEO is determined to decrease with decrease of the target blowing temperature TAO. Further, the target evaporation temperature TEO is determined to be within a range in which frosting of the indoor evaporator 18 can be reduced (specifically, 1 degree Celsius or more).

The controller 50 adjusts a degree of throttling of the second expansion valve 14b such that a degree of subcooling of the refrigerant flowing into the second expansion valve 14b becomes a target degree of subcooling for the cooling operation. The target degree of subcooling for the cooling operation is determined based on the outdoor unit refrigerant pressure Ps and the outdoor heat exchanger temperature Td3 with reference to a control map stored in advance in the controller 50. In this control map, the target degree of subcooling for the cooling operation is determined such that a coefficient of performance COPr of the cycle approaches a maximum value.

In the cooling mode of the refrigeration cycle device, the outdoor heat exchanger 16 functions as a radiator, and the indoor evaporator 18 functions as an evaporator. Thus, the refrigerant absorbs heat from air at the time of evaporation in the indoor evaporator 18 and releases the absorbed heat to outside air in the outdoor heat exchanger 16. Thereby, the air can be cooled. Accordingly, in the cooling mode, the air cooled by the indoor evaporator 18 is blown into the vehicle compartment, and thereby cooling of the vehicle compartment can be performed.

The refrigerant that has passed through the check valve 17 can be branched into a flow from the fifth three-way joint 13e toward the second expansion valve 14b and a flow toward the battery 25. A throttle mechanism (not shown) is arranged on the refrigerant path from the fifth three-way joint 13e to the battery 25. Therefore, a low-pressure refrigerant which has been reduced by the throttle mechanism is supplied to a periphery of the battery 25. Accordingly, generated heat in the battery 25 can be absorbed by evaporative latent heat of the low-pressure refrigerant. Hence, the refrigeration cycle device 10 in the cooling mode can cool the battery 25.

(b) Dehumidifying Heating Mode

Next, an operation of the refrigeration cycle device 10 in the dehumidifying heating mode will be described. In the dehumidifying heating mode, the controller 50 controls the first expansion valve 14a into a throttled state and the second expansion valve 14b into a throttled state. Further, the controller 50 opens the first on-off valve 15a and the second on-off valve 15b. The controller 50 controls the air mixing door 34 such that the air passage of the heater core 43 is fully open and the bypass passage 35 is fully closed.

Thus, in the dehumidifying heating mode of the refrigeration cycle device 10, as indicated by the hatched arrows in FIG. 1, a vapor compression refrigeration cycle is formed in which the refrigerant circulates in sequence: compressor 11→radiator 12→first expansion valve 14a→outdoor heat exchanger 16→second on-off valve 15→accumulator 20→compressor 11, while the refrigerant circulates in sequence: compressor 11→radiator 12→first on-off valve 15a→second expansion valve 14b→indoor evaporator 18→evaporation pressure control valve 19→accumulator 20→compressor 11. That is, a refrigeration cycle is formed, in which the outdoor heat exchanger 16 and the indoor evaporator 18 are connected in parallel with respect to the refrigerant flow.

In this cycle configuration, the controller 50 determines a refrigerant discharge capacity of the compressor 11 (i.e., a control signal output to the electric motor of the compressor 11). Specifically, the operation of the compressor 11 is controlled such that a pressure of the refrigerant flowing into the radiator 12 becomes a target condensation pressure PDO.

The target condensation pressure PDO is determined based on the target blowing temperature TAO with reference to a control map stored in advance in the controller 50. In the control map, the target condensation pressure PDO is determined to increase with increase of the target blowing temperature TAO.

The controller 50 controls the operation of the first expansion valve 14a and the second expansion valve 14b on the basis of the target blowing temperature TAO with reference to a control map stored in advance in the controller 50 such that the coefficient of performance COPr of the cycle approaches the maximum value. Specifically, the controller 50 decreases the degree of throttling of the first expansion valve 14a with increase in target blowing temperature TAO.

Accordingly, in the dehumidifying heating mode of the refrigeration cycle device 10, a refrigeration cycle is formed in which the radiator 12 functions as a radiator, and the outdoor heat exchanger 16 and the indoor evaporator 18 function as an evaporator.

In the vehicle air conditioner 1, the refrigerant absorbs heat at the time of evaporation in the outdoor heat exchanger 16 and the indoor evaporator 18, and releases the absorbed heat to the vent air via the radiator 12 and the heating medium circuit 40. As a result, the vent air that has been cooled and dehumidified by the indoor evaporator 18 can be reheated in the heater core 43.

Therefore, in the dehumidifying heating mode, the vent air cooled and dehumidified in the indoor evaporator 18 is reheated by the heater core 43 via the radiator 12 and the heating medium circuit 40 and then blown into the vehicle compartment. Accordingly, dehumidifying and heating of the vehicle compartment can be performed. Since the refrigeration cycle device 10 can reheat the dehumidified vent air, the refrigeration cycle device 10 functions as one of the heat source devices in the dehumidifying heating mode.

(c) Heating Mode

Next, an operation of the refrigeration cycle device 10 in the heating mode will be described. In the heating mode, the controller 50 controls the first expansion valve 14a into a throttled state and the second expansion valve 14b into a fully closed state.

Further, the controller 50 closes the first on-off valve 15a and opens the second on-off valve 15b. The controller 50 controls the air mixing door 34 such that the air passage of the heater core 43 is fully open and the bypass passage 35 is fully closed.

Thus, in the heating mode of the refrigeration cycle device 10, as indicated by the black arrows in FIG. 1, a vapor compression refrigeration cycle is formed in which the refrigerant circulates in sequence: compressor 11→radiator 12→first expansion valve 14a→outdoor heat exchanger 16→second on-off valve 15b→accumulator 20→compressor 11.

In this cycle configuration, the controller 50 determines a refrigerant discharge capacity of the compressor 11 (i.e., a control signal output to the electric motor of the compressor 11). Specifically, the operation of the compressor 11 is controlled such that a pressure of the refrigerant flowing into the radiator 12 becomes a target condensation pressure PDO.

The target condensation pressure PDO is determined based on the target blowing temperature TAO with reference to a control map stored in advance in the controller 50. In the control map, the target condensation pressure PDO is determined to increase with increase of the target blowing temperature TAO.

The controller 50 adjusts a degree of throttling of the first expansion valve 14a such that a degree of subcooling of the refrigerant flowing into the first expansion valve 14a becomes a target degree of subcooling for the heating operation. The target degree of subcooling for the heating operation is determined based on the high-pressure refrigerant pressure Pd detected by the discharge pressure sensor 56a with reference to a control map stored in advance in the controller 50. In this control map, the target degree of subcooling for the heating operation is determined such that the COPr of the cycle approaches a maximum value.

Accordingly, in the heating mode of the refrigeration cycle device 10, a refrigeration cycle is formed in which the radiator 12 functions as a radiator, and the outdoor heat exchanger 16 functions as an evaporator. Thus, the refrigerant absorbs heat from outside air at the time of evaporation in the outdoor heat exchanger 16, and releases the absorbed heat to the vent air in the heater core 43 via the radiator 12 and the heating medium circuit 40.

Accordingly, the refrigeration cycle device 10 can heat the vent air, and functions as one of the heat source devices in the present disclosure. Therefore, in the heating mode, the vehicle air conditioner 1 can heat the vehicle compartment by blowing out the vent air heated by the heater core 43 into vehicle compartment which is a heating target space.

As described above, in the vehicle air conditioner 1, at the time of heating of the vehicle compartment, i.e., an air-conditioned space, the heater core 43 constituting the heating medium circuit 40 radiates heat and heats the vent air. Thus, an operation of the heating medium circuit 40 in the heating mode will be described.

The hybrid vehicle equipped with the vehicle air conditioner 1 is configured to be capable of running in two running modes: the HV running mode and the EV running mode. Effective heat source in the heating mode also differs depending on the running mode of the hybrid vehicle.

Therefore, in the vehicle air conditioner 1, the controller 50 changes a flow path and a flow rate of the cooling water in the heating medium circuit 40 based on the running mode signal output from the vehicle controller 70.

First, an operation of the heating medium circuit 40 in the heating mode when the hybrid vehicle runs in the HV running mode will be described with reference to FIG. 3. In FIG. 3, a flow rate of the cooling water indicated by dashed arrows is smaller than a flow rate of the cooling water indicated by solid arrows. The flow rates are set such that a temperature of the cooling water indicated by the dashed arrows does not excessively decrease.

When the vehicle controller 70 outputs a running mode signal indicating the HV running mode in the heating mode, the controller 50 controls operations of the engine pump EGp, the heating water pump 41 and the flow control valve 47.

Specifically, the operations of the heating water pump 41 and the others are adjusted such that a flow rate of the cooling water flowing through a path including the first connection flow path 45 is higher than a flow rate flowing through a path including the second connection flow path 46.

In the HV running mode, the heating water pump 41 is controlled to have a low pumping capability. The flow control valve 47 is operated and controlled such that the inflow-outflow port leading to the first connecting portion 44a is connected to the inflow-outflow port leading to the third connecting portion 44c, and that the inflow-outflow port leading to the second connecting portion 44b is closed.

Accordingly, as shown in FIG. 3, the flow of the cooling water in the heating medium circuit 40 is adjusted to the path including the first connection flow path 45 and the path including the second connecting portion 44b. The path including the first connection flow path 45 means a path in which the cooling water circulates in sequence: engine EG→engine pump EGp→first connection flow path 45→first connection portion 44a→flow control valve 47→third connecting portion 44c→heater core 43→second connecting portion 44b→first connection flow path 45→engine EG.

On the other hand, the path including the second connection flow path 46 means a path in which the cooling water, after branching from the first connecting portion 44a, flows in sequence: first connecting portion 44a→second connection flow path 46→the heating water pump 41→the water heater 42→radiator 12→third connecting portion 44c, and then joins at the third connecting portion 44c.

A flow rate of the cooling water flowing through the path including the first connection flow path 45 corresponds to a first flow rate in the present disclosure. A flow rate of the cooling water flowing through the path including the second connection flow path 46 corresponds to a second flow rate in the present disclosure.

Accordingly, the flow rate of the cooling water flowing from the first connecting portion 44a to the third connecting portion 44c via the second connection flow path 46 is adjusted to a smallest flow rate required to reduce thermal shock loads on the heating water pump 41, the water heater 42 and the radiator 12. In other words, the flow rate of the cooling water flowing from the first connecting portion 44a to the third connecting portion 44c via the flow control valve 47 occupies most of the cooling water circulating in the heating medium circuit 40.

Since the cooling water passing through the heater core 43 has exhaust heat of the engine EG as described above, the heating medium circuit 40 can heat the vent air in the heater core 43 by using the exhaust heat of the engine EG as a heat source.

Therefore, according to the vehicle air conditioner 1, the heating in the HV running mode can be realized by effectively utilizing the exhaust heat of the engine EG as the heat source. In other words, according to the vehicle air conditioner 1, heating of the cooling water by the water heater 42 and the radiator 12 arranged in the second connection flow path 46 is not necessarily required for the heating of the vehicle compartment.

That is, the vehicle air conditioner 1 can heat the vehicle compartment by using the exhaust heat of the engine EG even at the time of stoppage of the heating by the water heater 42 or stoppage of the operation of the refrigeration cycle device 10 in the heating mode.

Further, since the flow rate of the cooling water in the second connection flow path 46 is reduced, increase in flow resistance of the cooling water in the second connection flow path 46 can be reduced. That is, the vehicle air conditioner 1 can reduce increase in water flow resistance in the entire heating medium circuit 40 in the HV running mode. In this case, the vehicle air conditioner 1 can reduce decrease in heating performance caused by more flow of the cooling water than necessary in the second connection flow path 46.

Here, a case will be considered, in which the heating by the water heater 42 and the operation of the refrigeration cycle device 10 in the heating mode are stopped and the inflow of cooling water into the second connection flow path 46 is shut off. In this case, the cooling water does not flow in the second connection flow path 46, so a temperature of the cooling water inside the water heater 42 and the radiator 12 decreases as time proceeds.

If the cooling water in the water heater 42 and the radiator 12 has cooled completely, the cooled cooling water flows into the heater core 43 at the time of restart of the heating by the water heater 42 and the operation of the refrigeration cycle device 10 in the heating mode. Temperature difference of the inflow cooling water may provide a large thermal shock load on the heater core 43 and cause deterioration or damage of the heater core 43.

In this respect, in the vehicle air conditioner 1 in the HV running mode, as shown in FIG. 3, the cooling water warmed by the exhaust heat of the engine EG passes through the water heater 42 and the radiator 12 via the second connection flow path 46.

Therefore, the temperature of the cooling water inside the water heater 42 and the radiator 12 does not drop excessively. Even when the flow rate of the cooling water in the second connection flow path 46 is increased, the thermal shock load on the heater core 43 can be kept low, and deterioration and damage of the heater core 43 can be suppressed.

Figure 4:
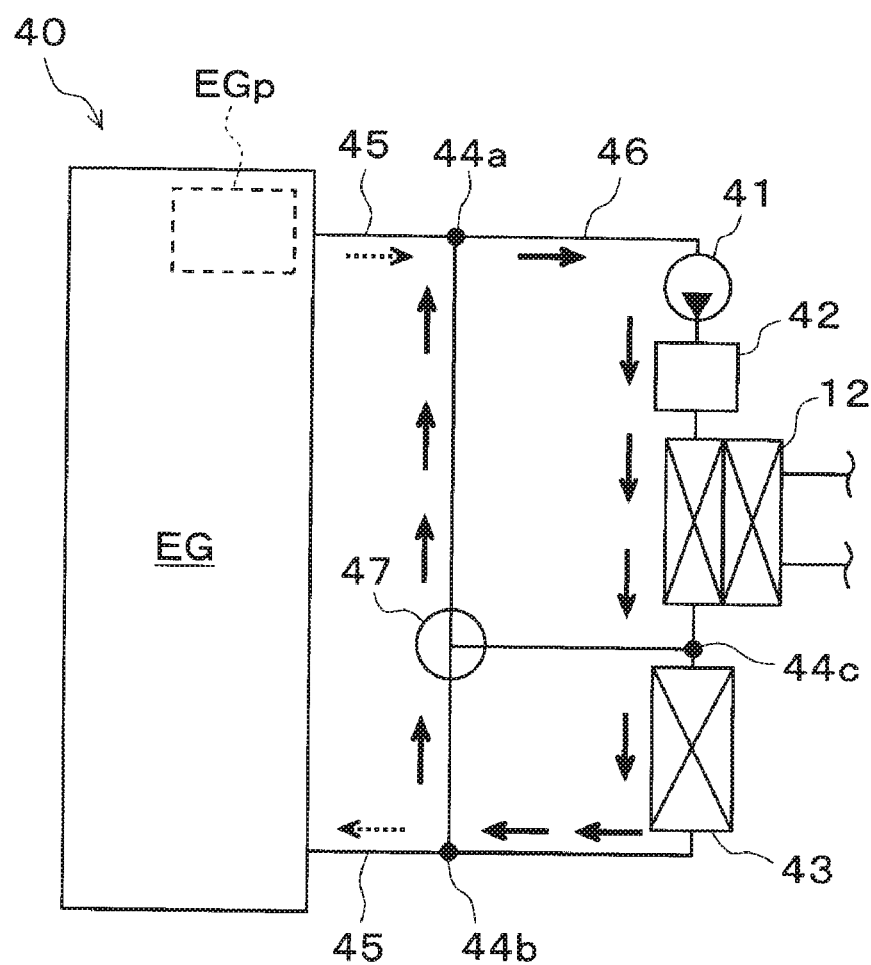
FIG. 4 is an explanatory diagram illustrating a state of a heating medium circuit in an EV running mode according to the first embodiment.

Next, an operation of the heating medium circuit 40 in the heating mode when the hybrid vehicle runs in the EV running mode will be described with reference to FIG. 4. In FIG. 4, a flow rate of the cooling water indicated by dashed arrows is smaller than a flow rate of the cooling water indicated by solid arrows. The flow rates are set such that a temperature of the cooling water indicated by the dashed arrows does not excessively decrease.

As described above, in the EV running mode, the hybrid vehicle runs by the vehicle-running electric motor driven by the electric power of the battery 25. That is, in the EV running mode, it is difficult to use the exhaust heat of the engine EG as a heat source for heating the cooling water of the heating medium circuit 40.

Therefore, when the vehicle air conditioner 1 heats the vehicle compartment in the EV running mode, the heating medium circuit 40 is configured such that the cooling water of the heating medium circuit 40 is heated by heat generated by the water heater 42 and heat radiated from the radiator 12 of the refrigeration cycle device 10.

When a running mode signal indicating the EV running mode is output from the vehicle controller 70 in the heating mode, the controller 50 controls operations of the engine pump EGp, the heating water pump 41 and the flow control valve 47. The flow rate of the cooling water flowing through the path including the second connection flow path 46 is adjusted to be higher than the flow rate flowing through the path including the first connection flow path 45.

In the EV running mode, the engine EG is not used as a drive source for running, so a cooling-water pumping capacity of the engine pump EGp is extremely small. In the EV traveling mode, a pumping capacity of the heating water pump 41 is controlled to be higher than that in the HV running mode. The flow control valve 47 is operated and controlled such that the inflow-outflow port leading to the first connecting portion 44a is connected to the inflow-outflow port leading to the second connecting portion 44b, and that the inflow-outflow port leading to the third connecting portion 44c is closed.

As a result, in the heating medium circuit 40 in the EV traveling mode, a path including the first connection flow path 45 and a path including the second connection flow path 46 are formed. As shown in FIG. 4, the path including the first connection flow path 45 in the EV running mode means a path in which the cooling water, after branching from the second connecting portion 44b, flows in sequence: second connecting portion 44b→first connection flow path 45→engine EG engine pump EGp→first connection flow path 45→first connecting portion 44a, and then joins at the first connecting portion 44a.

On the other hand, the path including the second connection flow path 46 in the EV running mode means a path in which the cooling water, after branching from the first connecting portion 44a, circulates in sequence: first connecting portion 44a→second connection flow path 46→the heating water pump 41→water heater 42→radiator 12→third connecting portion 44c→heater core 43→second connecting portion 44b→flow control valve 47→first connecting portion 44a.

Accordingly, in the EV running mode, the cooling water which has been heated by operation of the water heater 42 and high-pressure refrigerant passing through the radiator 12 can release heat to the vent air in the heater core 43. That is, the vehicle air conditioner 1 can use the water heater 42 and the radiator 12 of the refrigeration cycle device 10 as heat source devices when heating the vehicle compartment in the EV running mode.

Since the flow rate of the cooling water in the second connection flow path 46 is increased, the water heater 42 and the radiator 12 can be effectively utilized as a heating heat source, and the heating performance of the vehicle air conditioner 1 can be enhanced.

Further, since the flow rate of the cooling water in the first connection flow path 45 through the engine EG is reduced, increase in flow resistance of the cooling water in the first connection flow path 45 can be reduced. That is, the vehicle air conditioner 1 can reduce increase in water flow resistance in the entire heating medium circuit 40 in the EV running mode. In this case, the vehicle air conditioner 1 can reduce decrease in heating performance caused by more flow of the cooling water than necessary in the first connection flow path 45.

As described above, the vehicle air conditioner 1 according to the first embodiment has the heating medium circuit 40 including the engine EG arranged as the drive source of the hybrid vehicle, the heater core 43, and the heating water pump 41.

The vehicle air conditioner 1 can heat the vent air by release of heat from the cooling water in the heater core 43 of the heating medium circuit 40 to the vent air sent by the blower 32, thereby heating the vehicle compartment.

As shown in FIGS. 3 and 4, in the heating medium circuit 40 in the first embodiment, the engine EG is connected to the heater core 43 via the first connection flow path 45. Then, in the heating medium circuit 40, the water heater 42 and the radiator 12 of the refrigeration cycle device 10 are connected to the heater core 43 via the second connection flow path 46 and are arranged in parallel with respect to the engine EG.

In the HV running mode using the driving force of the engine EG, the cooling-water flow rate control unit 50c controls operations of the heating water pump 41 and others such that a flow rate of the cooling water in the engine EG and the first connection flow path 45 is higher than a flow rate of the cooling water in the second connection flow path 46. As a result, the vehicle air conditioner 1 can effectively utilize the exhaust heat of the engine EG to heat the vehicle compartment.

Since the exhaust heat of the engine EG can be utilized in this HV running mode, the necessity of the radiator 12 and the water heater 42 as a heating heat source is lower than that in the EV running mode. Under this situation, the flow rate of the cooling water in the second connection flow path 46 through the water heater 42 and the radiator 12 can be reduced. Thus, the vehicle air conditioner 1 can reduce water flow resistance in the entire heating medium circuit 40 and can suppress deterioration in heating performance in the HV running mode.

The flow rate of the cooling water in the second connection flow path 46 is set to a low flow rate so that the temperature of the cooling water inside the water heater 42 and the radiator 12 can be maintained. Thus, even when the flow rate of the cooling water in the second connection flow path 46 is increased, it does not occur that the cooling water which has cooled completely flows into the heater core 43.

According to the vehicle air conditioner 1, the thermal shock load on the heater core 43 can be reduced, and deterioration and damage of the heater core 43 due to inflow of low-temperature cooling water can be suppressed.

As shown in FIGS. 1 and 3, the heating medium circuit 40 of the vehicle air conditioner 1 has the water heater 42 and thus can heat the cooling water flowing in the second connection flow path 46. Therefore, the vehicle air conditioner 1 can heat the vehicle compartment by using the water heater 42 as a heat source device in the EV running mode in which exhaust heat of the engine EG cannot be used.

Further, the heating medium circuit 40 according to the vehicle air conditioner 1 includes the radiator 12 of the refrigeration cycle device 10, and therefore the high-pressure refrigerant of the refrigeration cycle device 10 can release heat to the cooling water flowing in the second connection flow path 46. Therefore, the vehicle air conditioner 1 can heat the vehicle compartment by using the radiator 12 of the refrigeration cycle device 10 as a heat source device in the EV running mode in which exhaust heat of the engine EG cannot be used.

Further, since the vehicle air conditioner 1 includes the refrigeration cycle device 10, it is possible to perform not only heating of the vehicle compartment but also cooling and dehumidifying heating of the vehicle compartment.

Second Embodiment

A second embodiment different from the first embodiment described above will be described with reference to FIG. 6. A vehicle air conditioner 1 according to the second embodiment is mounted on a hybrid vehicle as in the first embodiment. The hybrid vehicle in the second embodiment can switch between the HV running mode and the EV running mode by control of a vehicle controller 70.

The vehicle air conditioner 1 according to the second embodiment, similar to the first embodiment, includes a refrigeration cycle device 10, an indoor air conditioning unit 30, a heating medium circuit 40 and a controller 50.

The vehicle air conditioner 1 according to the second embodiment has the same configuration as that of the first embodiment, except for specific configurations of the heating medium circuit 40. Therefore, explanations about the refrigeration cycle device 10, the indoor air conditioning unit 30, the controller 50, and other components according to the second embodiment has already been made, and thus will be omitted.

The heating medium circuit 40 according the second embodiment is, similar to the first embodiment, a heat medium circuit that circulates a cooling water between a radiator 12 of the refrigeration cycle device 10, component apparatuses of the hybrid vehicle, and a heater core 43. The heating medium circuit 40 includes the radiator 12 of the refrigeration cycle device 10, an engine EG, a heating water pump 41, a water heater 42, and the heater core 43.

Figure 5:
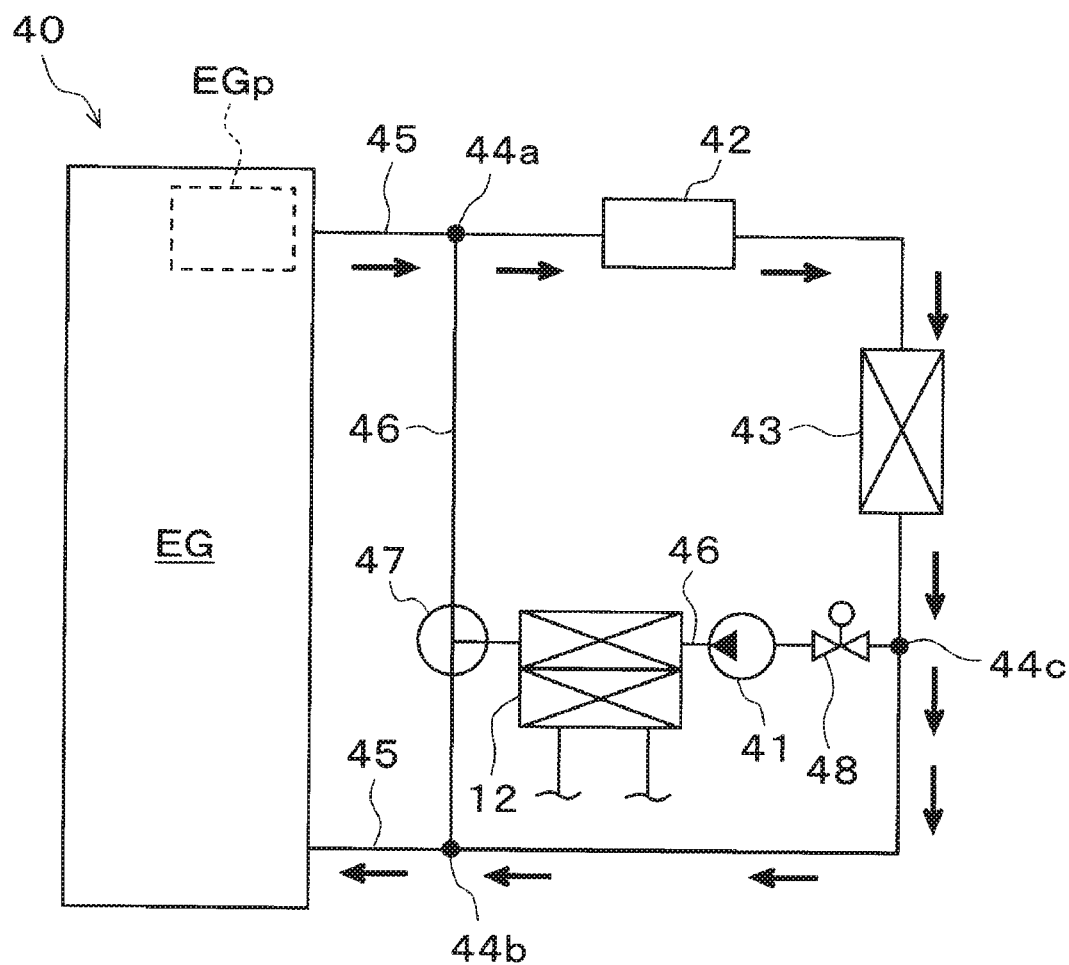
FIG. 5 is an explanatory diagram illustrating a state of a heating medium circuit in an HV running mode according to a second embodiment.
Figure 6:
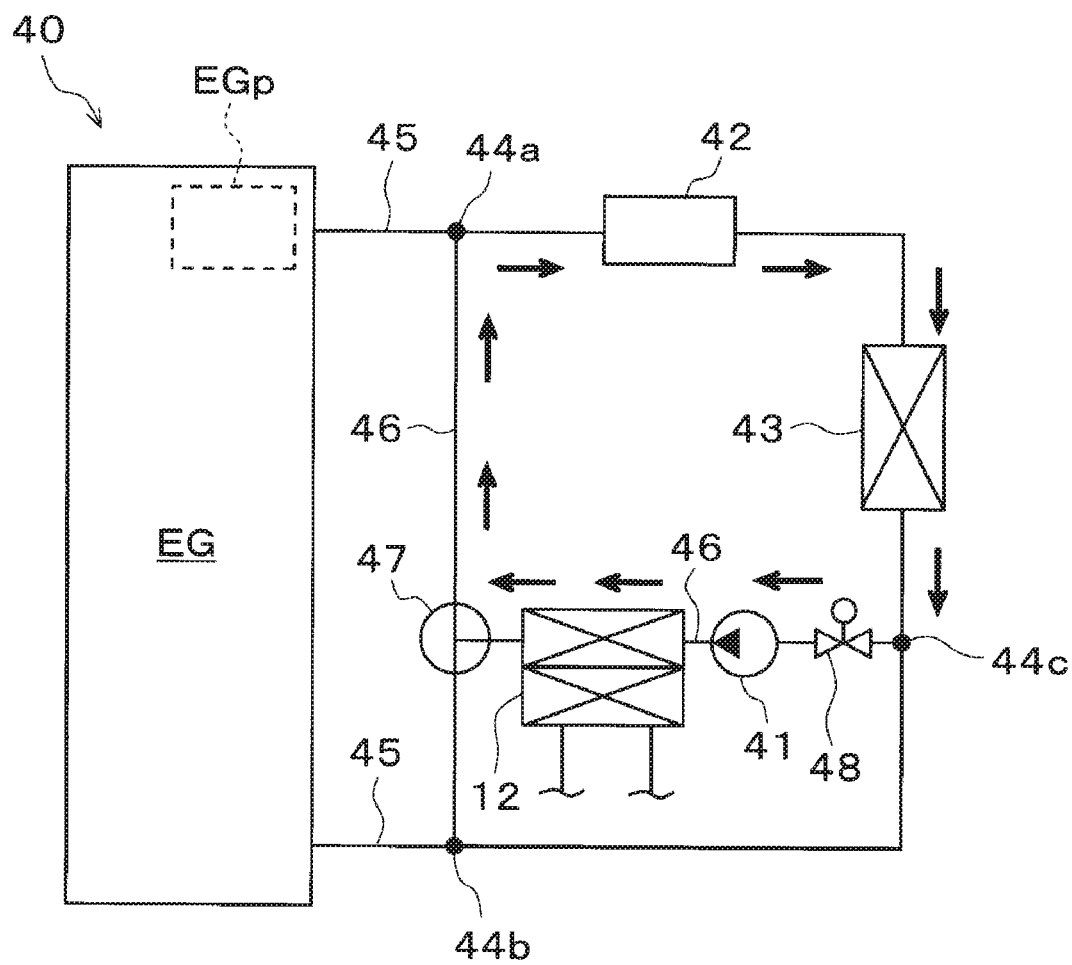
FIG. 6 is an explanatory diagram illustrating a state of a heating medium circuit in an EV running mode according to the second embodiment.

As shown in FIGS. 5 and 6, an engine pump EGp is arranged in the engine EG on an outflow port side of the cooling water path. Also in the second embodiment, A discharge port side of the engine pump EGp is connected to an inflow-outflow port of a first connecting portion 44a.

One of inflow-outflow ports of the first connecting portion 44a according the second embodiment is connected to an inflow port side of the water heater 42. The water heater 42 heats the cooling water flowing through a cooling water flow path. The remaining one inflow-outflow port of the first connecting portion 44a is connected to one of inflow-outflow ports of a flow control valve 47.

A cooling-water outflow port side of the water heater 42 is connected to an inflow port side of the heater core 43. The heater core 43 is the heating heat exchanger that heats vent air via heat exchange between the cooling water circulating in the heating medium circuit 40 and the vent air that has passed through an indoor evaporator 18.

In the second embodiment, an outflow port side of the heater core 43 is connected to one inflow-outflow port side of a third connecting portion 44c. Another inflow-outflow port side of the third connecting portion 44c is connected to an inflow port side of an on-off valve 48. The remaining one inflow-outflow port of the third connecting portion 44c is connected to one inflow-outflow port side of the second connecting portion 44b.

In the heating medium circuit 40 according to the second embodiment, the on-off valve 48 is arranged to adjust a flow of the cooling water in the third connecting portion 44c. In the heating medium circuit 40, when the on-off valve 48 is closed, all the cooling water that has flowed into the third connecting portion 44c flows toward the second connecting portion 44b. When the on-off valve 48 is open, the cooling water flowing into the third connecting portion 44c is allowed to flow into the on-off valve 48.

Therefore, the on-off valve 48 constitutes one of devices to be controlled by a cooling water flow rate control unit 50c. The open/closed state of the on-off valve 48 is switched according to a control signal from the controller 50. The on-off valve 48 constitutes a part of a flow rate control unit in the present disclosure.

An outflow port side of the on-off valve 48 is connected to a suction port side of the heating water pump 41. The heating water pump 41 according to the second embodiment is a water pump that sucks the cooling water from the third connecting portion 44c and pumps it.

The discharge side of the heating water pump 41 is connected to a cooling-water inflow port of the radiator 12 of the refrigeration cycle device 10. In the radiator 12 at least in the heating mode, high-pressure refrigerant compressed by the compressor 11 releases heat to the cooling water circulating in the heating medium circuit 40 in the radiator 12.

The cooling-water outflow port side of the radiator 12 is connected to the flow control valve 47. As described above, one inflow-outflow port of the flow control valve 47 is connected to the first connecting portion 44a, and another inflow-outflow port is connected to the cooling-water outflow port side of the radiator 12.

The remaining one inflow-outflow port of the flow control valve 47 is connected to the second connecting portion 44b. Therefore, the flow control valve 47 is capable of adjusting a flow rate of the cooling water passing through each inflow-outflow port by actuating a valve element arranged inside the flow control valve 47.

As shown in FIG. 5, one inflow-outflow port side of the second connecting portion 44b is connected to the third connecting portion 44c, and another inflow-outflow port side is connected to the flow control valve 47. The remaining one inflow-outflow port side of the second connecting portion 44b is connected to a cooling-water inflow port side of the engine EG. Therefore, the heating medium circuit 40 according to the second embodiment can form a circulation circuit of the cooling water passing through the engine EG and the heater core 43, for example.

The heating medium circuit 40 according to the second embodiment has a first connection flow path 45. The first connection flow path 45 includes a cooling water path that connects an outflow port side of the engine EG and the first connecting portion 44a, and a cooling water path that connects an inflow port side of the engine EG and the second connecting portion 44b. The first connection flow path 45 corresponds to a first flow path in the present disclosure.

The heating medium circuit 40 has a second connection flow path 46. The second connection flow path 46 is one of the cooling water paths that connect the first connecting portion 44a and the third connecting portion 44c. The radiator 12 is arranged in the second connection flow path 46, and the second connection flow path 46 passes through the flow control valve 47. The second connection flow path 46 corresponds to a second flow path in the present disclosure.

The vehicle air conditioner 1 according to the second embodiment, similar to the first embodiment, controls the heating medium circuit 40 according to the running mode in the heating mode. This point will be described with reference to the drawings.

First, an operation of the heating medium circuit 40 according to the second embodiment in the heating mode when the hybrid vehicle runs in the HV running mode will be described with reference to FIG. 5. In the second embodiment, when the vehicle controller 70 outputs a running mode signal indicating the HV running mode in the heating mode, the controller 50 controls operations of the engine pump EGp, the heating water pump 41, the flow control valve 47 and the on-off valve 48.

Specifically, a pumping capacity of the engine pump EGp is adjusted to a predetermined state. The operation of the heating water pump 41 is stopped, and the on-off valve 48 is controlled to be in a closed state. At this time, the flow control valve 47 may be controlled so as to block the flow between the first connecting portion 44a and the second connecting portion 44b.

Accordingly, as shown in FIG. 5, the flow of the cooling water in the heating medium circuit 40 becomes the path including the first connection flow path 45. The cooling water does not pass through the second connection flow path 46 in which the radiator 12 is arranged.

The path including the first connection flow path 45 according to the second embodiment means a path in which the cooling water circulates in sequence: engine EG→engine pump EGp→first connection flow path 45→first connection portion 44a→water heater 42→heater core 43→third connecting portion 44c→second connecting portion 44b→first connection flow path 45→engine EG.

As can be seen from FIG. 5, since the on-off valve 48 is in the closed state, the cooling water flowing into the third connecting portion 44c passes through the on-off valve 48. The cooling water does not flow into the heating water pump 41 and the radiator 12 arranged in the second connection flow path 46. That is, all the cooling water that has flowed into the third connecting portion 44c flows into the engine EG via the second connecting portion 44b as it is.

Thus, also in the second embodiment, the vehicle air conditioner 1 can effectively utilize the exhaust heat of the engine EG to heat the vehicle compartment. In the HV running mode, the cooling water does not flow into the second connection flow path 46 in which the radiator 12 and the heating water pump 41 are arranged. The vehicle air conditioner 1 can reduce increase in water flow resistance in the entire heating medium circuit 40 in the HV running mode. In this case, the vehicle air conditioner 1 can reduce decrease in heating performance caused by more flow of the cooling water than necessary in the second connection flow path 46.

Next, an operation of the heating medium circuit 40 according to the second embodiment in the heating mode when the hybrid vehicle runs in the EV running mode will be described with reference to FIG. 6. In the second embodiment, when the vehicle controller 70 outputs a running mode signal indicating the EV running mode in the heating mode, the controller 50 controls operations of the engine pump EGp, the heating water pump 41, the flow control valve 47 and the on-off valve 48.

Specifically, a pumping capacity of the heating water pump 41 is adjusted to a predetermined state, and the on-off valve 48 is controlled to an open state. The flow control valve 47 is controlled such that the inflow-outflow port leading to the first connecting portion 44*a* is connected to the inflow-outflow port leading to the third connecting portion 44*c*, and that the inflow-outflow port leading to the second connecting portion 44*b* is closed. Further, the operation of the engine pump EGp is stopped.

Accordingly, as shown in FIG. 6, the flow of the cooling water in the heating medium circuit 40 becomes the path including the second connection flow path 46 in which the radiator 12 is arranged. The cooling water does not pass through the first connection flow path 45 and the engine EG.

That is, the path including the second connection flow path 46 according to the second embodiment means a path in which the cooling water circulates in sequence: first connecting portion 44*a*→water heater 42→heater core 43→third connecting portion 44*c*→second connection flow path 46→on-off valve 48→heating water pump 41→radiator 12→flow control valve 47→second connection flow path 46→first connecting portion 44*a*.

Accordingly, in the EV running mode, the cooling water which has been heated by operation of the water heater 42 and high-pressure refrigerant passing through the radiator 12 can release heat to the vent air in the heater core 43. That is, the vehicle air conditioner 1 can use the water heater 42 and the radiator 12 of the refrigeration cycle device 10 as heat source devices when heating the vehicle compartment in the EV running mode.

Since the cooling water can be circulated in the second connection flow path 46, the water heater 42 and the radiator 12 can be effectively utilized as a heating heat source, and the heating performance of the vehicle air conditioner 1 can be enhanced.

Further, since the cooling water does not flow in the first connection flow path 45 through the engine EG, an influence of flow resistance of the cooling water in the first connection flow path 45 can be avoided. That is, the vehicle air conditioner 1 can reduce increase in water flow resistance in the entire heating medium circuit 40 in the EV running mode. In this case, the vehicle air conditioner 1 can reduce decrease in heating performance caused by flow of the cooling water in the first connection flow path 45.

As described above, according to the vehicle air conditioner 1 of the second embodiment, operational effects exerted by the configurations common with the first embodiment can be obtained similar to the first embodiment.

Then, in the vehicle air conditioner 1 according to the second embodiment, when the vehicle is running in the HV running mode and in the heating mode, the cooling water is circulated through the engine EG without flowing into the second connection flow path 46.

Therefore, in the HV running mode, the vehicle air conditioner 1 can maximally utilize the exhaust heat of the engine EG to heat the vehicle compartment. Then, the cooling water does not flow into the second connection flow path 46.

Therefore, in this case, the flow of the cooling water in the heating medium circuit 40 is not affected by a water flow resistance generated at the time of flowing through the radiator 12 and the others. That is, the vehicle air conditioner 1 can avoid deterioration in heating performance caused by the flow of cooling water in the second connection flow path 46.

Then, when the vehicle is running in the EV running mode and in the heating mode, the vehicle air conditioner 1 can circulates the cooling water in the second connection flow path 46 without flowing into the first connection flow path 45 and passing through the engine EG.

Therefore, in the EV running mode, the vehicle air conditioner 1 can maximally utilize the heat of the heat source device such as the radiator 12 and the water heater 42 to heat the vehicle compartment. Then, the cooling water does not flow into the first connection flow path 45.

Therefore, in this case, the flow of the cooling water in the heating medium circuit 40 is not affected by a water flow resistance generated at the time of flowing through the engine EG. That is, the vehicle air conditioner 1 can avoid deterioration in heating performance caused by the flow of cooling water in the first connection flow path 45.

Other Embodiments

The present disclosure described above based on the respective embodiments is not limited to the embodiments. Accordingly, various improvements and modifications may be made without departing from the scope of the present disclosure. For example, the respective embodiments described herein may be combined as appropriate, or may be modified in various manners.

(1) In the above-described embodiments, the vehicle air conditioner 1 is configured to be capable of performing not only the heating operation but also the cooling operation and the dehumidifying heating operation, but the present invention is not limited to this embodiment. The present disclosure may be configured as a vehicular heater dedicated to heating as long as at least heating is possible.

(2) In the above-described embodiments, the flow rate of the cooling water in the heating medium circuit 40 is adjusted according to the switching of the running mode in the heating mode, but the present invention is not limited to this embodiment.

Regarding the adjustment of the cooling water flow rate in the heating medium circuit 40, the cooling water flow rate may be adjusted according to the switching of the running mode in an operation mode as long as the operation mode heats the vent air through the cooling water that is the heat medium. For example, it may be applied to the dehumidifying heating mode when the dehumidified vent air is heated.

(3) In the above-described embodiments, the heat source device according to the present disclosure has the radiator 12 of the refrigeration cycle device 10 and the water heater 42, but is not limited to this mode.

For example, in the heating medium circuit 40 according to the above-described embodiments, only the radiator 12 of the refrigeration cycle device 10 may be arranged as the heat source device, or only the water heater 42 may be arranged as the heat source device.

Further, as the heat source device in the present disclosure, it is sufficient that the heat medium circulating in the heat medium circuit can be heated. Thus, various devices different from the radiator 12 and the water heater 42 of the refrigeration cycle device 10 can be applied to the heat source device.

(4) The arrangement of the heat source devices (e.g., the radiator 12 and the water heater 42) in the heat medium circuit is not limited to the arrangements shown in FIGS. 3 to 6. The arrangement of each component in the heat medium circuit may be modified arbitrarily as long as the cooling water circulates in the heater core through the power unit in a mode that requires operation of the power unit, such as the HV running mode, while the cooling water circulates in the heater core through the heat source device in a mode that does not require the operation of the power unit, such as the EV running mode.

For example, in the heating medium circuit 40, the heat source device such as the radiator 12 and the water heater 42 may be arranged downstream of the heater core 43 in flow of the cooling water.

(5) In the above-described embodiments, the flow rate control unit according to the present disclosure includes the flow control valve 47 including the three-way valve, but is not limited to this configuration. For example, the flow control valve 47 in the above-described embodiment can be configured with multiple valves (for example, a check valve and an on-off valve).

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A vehicular heater mounted on a vehicle having a power unit, the vehicular heater comprising:
   a blower that blows vent air into a vehicle compartment which is a space to be heated;
   a heat medium circuit connected to a heater core that heats the vent air blown by the blower via heat exchange with a heat medium;
   a pump that circulates the heat medium in the heat medium circuit;
   a valve configured to switch the heat medium circuit; and
   a controller configured to control the valve and the pump, wherein
   the heat medium circuit includes:
      a first flow path connected to the heater core through the power unit; and
      a second flow path arranged in parallel with the first flow path and connected to the heater core through a heat source device different from the power unit,
   the valve switches the heat medium circuit such that:
      when the power unit is operating, the first flow path includes a circuit bypassing the heat source device; and
   when the power unit is not operating, the second flow path includes a circuit bypassing the power unit,
   the valve is disposed in the heal medium circuit at a position different than a position of a connecting portion that connects and is between the first flow path and the second flow path,
   the controller controls the valve and the pump to adjust a first flow rate of the heat medium flowing into the first flow path and a second flow rate of the heat medium flowing into the second flow path, and
   when the power unit is operating, the controller:
      controls the valve and the pump such that the heat medium flows in both the first flow path and the second flow path; and
      adjusts the second flow rate to a flow rate determined for reducing a thermal shock load in the second flow path.

2. The vehicular heater according to claim 1, wherein the heat source device has a heater that is arranged in the second flow path and heats the heat medium flowing in the second flow path.

3. The vehicular heater according to claim 1, comprising a refrigeration cycle device includes a compressor that compresses refrigerant, a radiator that releases heat of the refrigerant at high pressure compressed by the compressor to the heat medium, and a decompressor that decompresses the refrigerant flowing out of the radiator, and an evaporator that evaporates the refrigerant decompressed by the decompressor, wherein
   the heat source device includes the radiator of the refrigeration cycle device.

4. The vehicular heater according to claim 1, wherein when the power unit is not operating, the controller:
   controls the valve and the pump such that the heat medium flows in both the first flow path and the second flow path; and
   adjusts the second flow rate to be larger than the first flow rate.

5. A vehicular heater mounted on a vehicle having a power unit, the vehicular heater comprising:
   a blower that blows vent air into a vehicle compartment which is a space to be heated;
   a heat medium circuit connected to a heater core that heats the vent air blown by the blower via heat exchange with a heat medium;
   a pump that circulates the heat medium in the heat medium circuit;
   a valve configured to switch the heat medium circuit; and
   a controller configured to control the valve and the pump, wherein
   the heat medium circuit includes:
      a first flow path connected to the heater core through the power unit; and
      a second flow path arranged in parallel with the first flow path and connected to the heater core through a heat source device different from the power unit,
   the valve switches the heat medium circuit such that:
      when the power unit is operating, the first flow path includes a circuit bypassing the heat source device; and
      when the power unit is not operating, the second flow path includes a circuit bypassing the power unit,
   the valve is disposed in the heat medium circuit at a position different than a position of a connecting portion that connects and is between the first flow path and the second flow path,
   the controller controls the valve and the pump to adjust a first flow rate of the heat medium flowing into the first flow path and a second flow rate of the heat medium flowing into the second flow path, and
   when the power unit is operating, the controller:
      controls the valve and the pump such that the heat medium flows in both the first flow path and the second flow path; and
      adjusts the first flow rate to be larger than the second flow rate.

* * * * *